Nov. 22, 1960 H. H. FRANZ 2,961,088
EXTENDIBLE CONVEYOR
Filed May 8, 1959
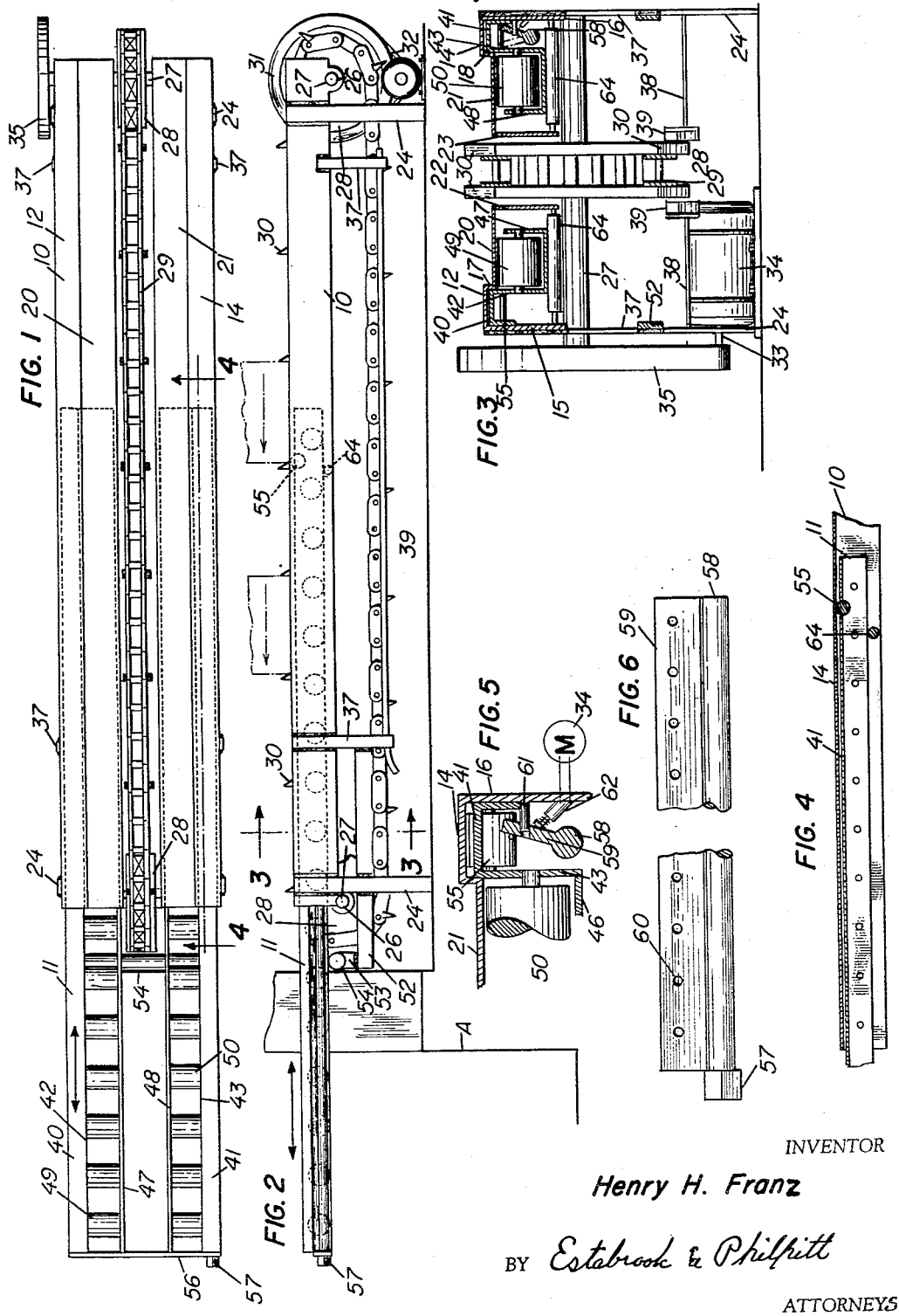
INVENTOR
Henry H. Franz
BY Estabrook & Philpitt
ATTORNEYS

2,961,088
EXTENDIBLE CONVEYOR

Henry H. Franz, 3201 Falls Cliff Road,
Baltimore 11, Md.

Filed May 8, 1959, Ser. No. 812,024

7 Claims. (Cl. 198—66)

The present invention relates broadly to conveyors but more specifically to improvements in a telescopically adjustable loading conveyor.

In many plants or warehouses, it is essential that delivery trucks or trailers be loaded with merchandise as rapidly as possible and then removed from the shipping platform so that another truck may be loaded. This is especially true when a relatively small shipping platform or area must be used to load a great many delivery trucks within a very short period of time. The foregoing is found to be quite in point where certain items, articles or commodities are delivered on a daily basis and usually at the same general time each day. Such is the case with regard to the delivery of milk, bread, newspapers and the like.

The loading of such vehicles at a shipping platform can in many instances require the services of several people and consume considerable time as the items or articles to be loaded are passed from one person to another. The use of power driven conveyors has been adopted in many instances but such conveyors cannot project beyond the edge of the shipping platform due to the movement of the trucks. In certain installations extensible conveyors have been utilized to load delivery trucks whereby only one person was needed to effect the loading.

One of the objects of the present invention is to provide an adjustable conveyor that can be extended and retracted longitudinally for accommodating varying conditions of distance in loading delivery trucks and the like.

Another object is to provide a conveyor consisting of a fixed section and an extendible section with control means on the extendible section for varying its position with respect to the fixed section.

Another object is to provide a conveyor consisting of a fixed section with power driven conveyor means and an extendible section with means carried by the extendible section for operating the power driven means of the fixed section.

A further object is to provide a conveyor consisting of a fixed section and a movable section that is telescopically disposed within the fixed section for varying the length of the conveyor.

A still further object is to provide a conveyor consisting of a fixed section and an extendible section supported by the fixed section with the extendible section projecting into a truck or the like in spaced relation to the bed of the truck, whereby an operator may remove articles from the end of the extendible section for placing in the truck.

Still further objects are to provide a conveyor that requires an installation area that is equal to only a portion of its overall length, one that is relatively economical to manufacture and which is positive in its operation under varying conditions.

Other objects and advantages, more or less auxiliary to the foregoing in the manner in which all of the various objects are realized will appear in the following description which, when considered in connection with the accompanying drawing, sets forth the preferred embodiment of the invention.

Referring to the drawing wherein the preferred embodiment of the present invention is disclosed:

Figure 1 is a top plan view of the conveyor of the present invention;

Figure 2 is a side elevational view showing the fixed conveyor section with the power driven conveyor chain and an extendible section that is telescopically positioned within the fixed section;

Figure 3 is an enlarged sectional view of the conveyor showing the fixed and extendible sections, the view being taken on a plane indicated by the line 3—3 of Figure 2;

Figure 4 is a detailed sectional view showing the telescopic relation of a portion of the fixed and movable sections of the conveyor, the view being taken on the plane 4—4 of Figure 1;

Figure 5 is an enlarged detailed view of the locking bar for securing the movable section with respect to the fixed section and also a control switch for the motor; and Figure 6 is an enlarged fragmentary view of the locking bar carried by the movable section of the conveyor.

Referring to the drawings, there is shown in Figure 1 a conveyor consisting of an elongated stationary or fixed frame structure 10 and an elongated movable or extendible frame structure 11 with the latter being telescopically positioned within the former. The fixed frame 10 includes a pair of inverted channel shaped members 12 and 14 arranged in spaced parallel relation to one another, Figure 3, with the outer depending webs 15 and 16 thereof being of greater length than the inner webs 17 and 18, respectively. The lower ends of the inner webs 17 and 18 have formed integrally therewith inwardly extending horizontal supporting portions or members 20 and 21 which have at their innermost edges depending webs 22 and 23, respectively, which are of a length comparable with that of the outer depending webs 15 and 16. The horizontal portions or members 20 and 21 serve as supporting elements for any goods that are to be moved on the conveyor, while the inner webs 17 and 18 act as guides for said goods moving over the members 20 and 21 and function to prevent same from moving off the conveyor.

The fixed frame 10 is supported at the ends thereof by legs 24 which are secured, by any suitable means, to the outer webs 15 and 16 of the channel members 12 and 14, respectively. The webs 15 and 16 and the depending webs 22 and 23 have formed at their respective ends suitable bearing members 26, Figure 2, in which are journalled shafts 27 that have secured thereon sprockets 28. The sprockets 28 are positioned on the shafts 27, intermediate the depending webs 22 and 23, and a conventional conveyor chain 29 having spaced article engaging elements 30 is entrained over the sprockets for moving goods along the horizontal members 20 and 21. The conveyor chain 29 may be driven by any suitable power means, and, as an illustration, there is shown secured to one of the shafts 27 a pulley 31 about which is entrained a belt 32 that passes around a pulley that is mounted on the armature shaft 33 of a motor 34, Figures 2 and 3. A suitable guard or shield 35, Figure 3, encloses the pulleys and belt which drive the conveyor chain. The webs 15 and 16 of channel members 12 and 14 have secured at each end thereof, adjacent the supporting legs 24, depending arms 37 which terminate in inwardly extending braces 38. The braces 38 have members 39 secured thereto, which members extend substantially the length of the fixed frame 10 and constitute a support or trackway for the lower or return run of the conveyor chain 29.

The movable frame structure 11 which is adapted to be telescoped within the fixed frame 10 and may be adjustably extended with respect thereto is constructed in a manner somewhat similar to that of the fixed frame 10, The movable frame 11 includes a pair of spaced channel shaped members 40 and 41 which are adapted to pass, in a telescopic manner, into the pair of channel members 12 and 14, respectively, of the fixed frame 10, Figure 3. The innermost depending webs 42 and 43 of the channel members 40 and 41 are of a greater length than the corresponding inner webs 17 and 18 of channel members 12 and 14, and said webs 42 and 43 terminate in inwardly extending horizontal members 45 and 46. The horizontal members 45 and 46 have formed at their inner edges upwardly extending legs 47 and 48 which are disposed in spaced parallel relation to the webs 42 and 43 and to the webs 22 and 23 when the frame 11 is telescoped within frame 10. Thus, the movable frame 11 might be described as including a pair of spaced inverted channel shaped members and a pair of spaced U-shaped channel members so arranged that each inverted channel member and each U-shaped channel member has a common web or leg.

The upwardly extending leg 47 and the inner depending web 42 of the channel member 40 have mounted therein on suitable axles a plurality of rollers 49 which are disposed in spaced relation to one another throughout the length of the channel member. The upwardly extending leg 48 and web 43 of channel member 41 also have rollers 50 mounted therein in spaced aligned relation with the rollers 49. The upper peripheral surface of the rollers 49 and 50 is positioned slightly below the top surface of channel members 40 and 41, respectively, so that the uppermost portion of the webs 42 and 43 serve as guides for any articles or goods while the rollers 49 and 50 serve to support and convey the goods as they are moved from the supporting members or surfaces 20 and 21 of the fixed frame 10 onto the movable frame 11. It is to be noted that the upper peripheral surface of the rollers 49 and 50 are positioned just slightly beneath the supporting surfaces 20 and 21 of the fixed channel member, and furthermore that the supporting surfaces 20 and 21 are positioned just slightly below the upper surface of the channel members 40 and 41. This arrangement insures that the movable frame when in an extended position is substantially in the same plane as the supporting surfaces of the fixed frame.

The frame 10 has extending from the front or forward end thereof a pair of arms 52 that are secured to the legs 24 and arms 37 subjacent the channel members 12 and 14. The arms 52, Figure 2, terminate in upwardly projecting brackets 53 which have mounted therein a roller 54 that is adapted to engage the bottom faces of the horizontal members 45 and 46 for supporting the frame 11 as it is moved into or out of telescopic engagement with frame 10.

As shown in Figures 2 and 3, the frame 10 has mounted therein about midway of its length rollers 64 for supporting the frame 11 when it is fully telescoped or retracted within the frame 10. The rollers 64 are carried by suitable shafts that have their ends mounted in the webs 15 and 22 and in the webs 16 and 23. Thus, the roller 64 positioned between webs 15 and 22 will engage the lower face or surface of member 45 and roller 64 positioned between webs 16 and 23 will engage the lower face or surface of horizontal member 46 for supporting the frame 11 in its telescoped position.

As shown in Figures 4 and 5, the inner end of the frame 11 has mounted in the upper portion of the channel members 40 and 41 a roller 55 which is adapted to engage and move over the bottom or lower surface of channel members 12 and 14. Thus, the supporting rollers 54 and 64 as they engage the members 45 and 46 of frame 11 and rollers 55 as they engage channel members 12 and 14 of the fixed frame 10 insure the ready retraction or advancement by the operator of the movable frame 11 in a horizontal position and prevent the forward end thereof, when in its extended position, from sagging or tilting.

The front or forward end of the frame 11 has secured thereto a vertically extending plate member 56 which serves as a stop for the goods moving over the rollers 49 and 50. The plate 56 has rotatably mounted therein one end of a control member 57 which consists of an elongated tubular member 58 with a flange 59 projecting therefrom. The control member 57 extends parallel to the channel 41 and is positioned between the web 43 of channel 41 and web 16 of channel 14. The control member 57 is supported by a suitable bearing bracket, not shown, that may be mounted on web 16 so that said control member can be moved in unison with and by the movable frame 11. Furthermore, control member 57 is adapted to have an oscillatory movement when the operator turns the end of the control member carried by the stop plate 56. The flange 59 of the control member 57, Figures 5 and 6, is provided with a plurality of spaced apertures 60 which are adapted to receive a pin 61 that is secured to the web 16 of channel 14 for locking frame 11 in a fixed position with respect to frame 10. There is also mounted on web 16 subjacent pin 61 a spring controlled switch 62 that is actuated by the flange 59 contemporaneous with the engagement of the pin 61 with one of the apertures 60 for closing the circuit to the motor 34.

In the use of the conveyor for the delivery of articles or goods, such as cases of milk, or bundles of newspapers, the fixed conveyor frame 10 is mounted within a warehouse or building for receiving such goods that are to be delivered to a truck parked at the shipping platform A, Figure 2. The forward end of the fixed conveyor frame 10 terminates within the building adjacent a door or opening that leads to the shipping platform A, so that the movable conveyor frame 11 may be drawn outwardly from the fixed frame 10 through said opening into the body of the truck or trailer that is parked at the shipping platform for the purpose of receiving the goods from said building or warehouse.

The conveyor of the present invention is so designed that the person unloading the conveyor at the stop plate 56 is able to control the extension or retraction of the movable frame 11 with respect to the fixed frame 10. Thus, the operator by pulling on the plate 56 may draw the movable frame 11 to its extended position, whereby its forward end will project into the body of the truck to facilitate the loading of packages from the conveyor onto the truck and after the conveyor has been extended the proper distance the operator turns the control member 57 to engage one of the apertures 60 with the locking pin 61 for securing the movable frame 11 to the fixed frame 10 and at the same time closing the circuit to the motor, whereby the conveyor chain 29 may be operatively driven by the sprockets 28. With the frame structures 10 and 11 secured or locked together, articles placed upon the fixed conveyor will be engaged by elements 30 of the conveyor chain 29 and propelled along the supporting members 20 and 21 from whence they will be delivered onto the rollers 49 and 50 of the movable frame structure 11.

The rollers 49 and 50 are not power driven but have a free rotative movement, so that articles will progressively move forward over said rollers until they engage the stop plate 56 due to succeeding articles moving off the fixed conveyor frame 10 onto the rollers 49 and 50 under the motive power of the conveyor chain 29.

As the truck or trailer becomes loaded with articles from the conveyor, it is necessary to retract or telescope the movable frame 11 into the fixed frame 10 so that the forward end of the movable frame 11 will not extend as far into the body of the truck. In order to adjust the movable frame 11 with respect to the fixed frame 10, the operator turns the control member 57 which moves the flange 59 out of locking engagement with the pin 61 and also out of engagement with the control switch 62 which action breaks the circuit to the motor and stops the conveyor chain 29. The operator then manually removes from the forward end of the movable frame 11 the first two or three articles thereon and inasmuch as the conveyor chain 29 is not rotating, additional articles will not move off the supporting members 20 and 21 of the fixed frame 10 onto the rollers 49 and 50, and thus the articles on the movable frame 11 will not be advanced towards the forward end thereof. The operator may then manually slide the movable frame 11 into the fixed frame 10 until the forward end of the movable frame 11 is positioned within the truck body at the point desired by the operator. After so positioning the movable frame 11, the operator will then turn the control member 57 to a position for locking the movable frame to the fixed frame and at the same time actuate the motor control switch for closing the circuit to the motor allowing the conveyor chain to rotate for the purpose of delivering articles to the movable conveyor frame 11.

What I claim is:

1. In a conveyor the combination of a fixed frame and a movable frame telescopically positioned within the fixed frame, said fixed frame including a pair of longitudinally extending article supporting members arranged in spaced parallel relation to one another, an endless conveyor positioned between said supporting members and extending throughout their length, said movable frame including a pair of longitudinally extending channel members, said channel members having a plurality of rollers mounted therein in spaced relation to one another and in alignment with said article supporting members, the upper peripheral surface of said rollers being slightly below said article supporting members with the upper surface of the channel members of said movable frame being disposed in a plane above the plane of the article supporting members and slightly below the plane of the upper surface of the channel members of said fixed frame, and motor means on said fixed frame for driving said endless conveyor to move articles along said supporting members and onto said rollers.

2. In a conveyor the combination of a fixed frame and a movable frame telescopically positioned within the fixed frame, said fixed frame including a pair of longitudinally extending channel members, said channel members having sprockets mounted at the ends thereof, an endless conveyor chain entrained over said sprockets, said channel members each having a continuous unbroken oppositely disposed surface formed integrally therewith and extending in a plane normal thereto, and constituting an article supporting surface with the channel members constituting guides for the articles on said supporting members, said article supporting members defining a path for said conveyor chain, said movable frame having a plurality of rollers mounted thereon in alignment with said article supporting members, a motor on said fixed frame for driving said conveyor chain to move articles along said supporting members and said rollers, and means carried by an end of said fixed frame and projecting forwardly thereof subjacent the movable frame for supporting said movable frame.

3. In a conveyor the combination of a fixed frame and a movable frame telescopically positioned within the fixed frame, said fixed frame including a pair of longitudinally extending channel members, said channel members having sprockets mounted at the ends thereof, an endless conveyor chain entrained over said sprockets, said channel members having article supporting members formed integrally therewith and arranged in spaced parallel relation to one another to define a path for said conveyor chain, said movable frame having a plurality of rollers mounted thereon in alignment with said article supporting members, a motor on said fixed frame for driving said conveyor chain to move articles along said supporting members and said rollers, a roller carried by and projecting from an end of said fixed frame for supporting said movable frame, a pair of rollers carried by an end of said movable frame and engageable with said channel members, said first named roller and said pair of rollers facilitating the telescopic positioning of said movable frame with respect to said fixed frame contemporaneous with supporting said movable frame in its extended and its retracted positions.

4. In a conveyor the combination of a fixed frame and a movable frame telescopically positioned within the fixed frame, said fixed frame including a pair of longitudinally extending channel members, said channel members having sprockets mounted at the ends thereof, an endless conveyor chain entrained over said sprockets, said channel members having article supporting members formed integrally therewith and arranged in spaced parallel relation to one another to define a path for said conveyor chain, said movable frame including a pair of spaced channel shaped members, said channel shaped members having a plurality of rollers mounted therein in spaced relation with one another and in alignment with said article supporting members of said fixed frame, the upper peripheral surface of said rollers being slightly below said article supporting members and the upper surface of the channel members of said movable frame being disposed in a plane above the plane of the article supporting members and slightly below the plane of the upper surface of the channel members of said fixed frame, a pin carried by said fixed frame, a control member carried by said movable frame and adapted to engage said pin for telescopic securing said movable frame in relation to said fixed frame, and motor means for driving said conveyor chain to move articles along said supporting members and said rollers.

5. A conveyor as defined in claim 4 wherein said control member is carried by an end of said movable conveyor and includes a tubular member having a flange formed integrally therewith, said flange having a plurality of spaced apertures provided therein for engagement with said pin for locking said movable frame in telescopic position with respect to said fixed frame.

6. In a conveyor the combination of a fixed frame and a movable frame telescopically positioned within the fixed frame, said fixed frame including a pair of longitudinally extending channel members, said channel members having sprockets mounted at the ends thereof with an endless conveyor chain entrained over said sprockets, said channel members having article supporting members formed integrally therewith and arranged in spaced parallel relation to one another to define a path for said conveyor chain, said movable frame including a pair of longitudinally extending channel shaped members of a configuration complementary to the channel members of said fixed frame, said channel shaped members of said movable frame having horizontally extending members formed integrally therewith, said horizontally extending members terminating in upwardly projecting leg portions defining channels for the reception of a plurality of spaced roller members, the upper peripheral surface of said rollers being slightly below the article supporting members and the upper surface of the channel members of said movable frame being positioned above said article supporting members and slightly below the upper surface of the channel members of said fixed frame when said movable frame is telescopically positioned within said fixed frame, the channel shaped members of said movable frame having rollers mounted at one end thereof for engagement with the channel members of said fixed frame to facilitate the telescopic movement of said movable frame with respect to the fixed frame, motor means for driving said conveyor chain to move articles along said supporting members and said rollers, and means carried by said movable frame and engageable with a pin on said fixed frame for securing said movable frame to said fixed frame.

7. In a conveyor the combination of a fixed frame and a movable frame telescopically positioned within the fixed frame, said fixed frame including a pair of longitudinally extending channel members disposed in spaced parallel relation to one another, the innermost leg portion of each channel having oppositely disposed members extending therefrom in a plane normally thereto and spaced from one another to define a passageway, said channel members having sprockets mounted at the ends thereof with an endless conveyor chain entrained thereover, said chain being positioned in said passageway, said members constituting article supports and said channel members acting as guides for the articles on said members, said movable frame including a par of longitudinally extending channel shaped members of a configuration complemetary to the channel members of said fixed frame, said channel shaped members of said movable frame having horizontally extending members formed integrally therewith, said horizontally extending members terminating in upwardly projecting leg portions defining channels for the reception of a plurality of spaced rollers, the upper peripheral surface of said rollers being disposed slightly below said article supporting members with the upper surface of the channel members of said movable frame being disposed in a horizontal plane above the horizontal plane of the article supporting members and slightly below the horizontal plane of the upper surface of the channel members of said fixed frame when said movable frame is telescopically positioned within said fixed frame, motor means for driving said conveyor chain to move articles along said supporting members between said channel members and along said rollers, and means carried by said movable frame engageable with a pin on said fixed frame for securing said movable frame to said fixed frame.

References Cited in the file of this patent

UNITED STATES PATENTS

| | | |
|---|---|---|
| 1,959,735 | Phillips | May 22, 1934 |
| 2,721,645 | Eberle | Oct. 25, 1955 |
| 2,895,593 | McKnight et al. | July 21, 1959 |